(12) United States Patent
Lees et al.

(10) Patent No.: US 12,312,115 B2
(45) Date of Patent: May 27, 2025

(54) PACKAGING SYSTEM AND SEAL JAW FOR PACKAGING FILM

(71) Applicant: ATS AUTOMATION TOOLING SYSTEMS INC., Cambridge (CA)

(72) Inventors: Richard Lees, Cambridge (CA); Roger Hogan, Cambridge (CA); Paul Green, Cambridge (CA)

(*) Notice: Subject to any disclaimer, the term of this patent is extended or adjusted under 35 U.S.C. 154(b) by 0 days.

(21) Appl. No.: 16/840,981

(22) Filed: Apr. 6, 2020

(65) Prior Publication Data

US 2020/0331648 A1 Oct. 22, 2020

Related U.S. Application Data

(60) Provisional application No. 62/829,729, filed on Apr. 5, 2019.

(51) Int. Cl.
*B65B 51/14* (2006.01)
*B29C 65/00* (2006.01)
(Continued)

(52) U.S. Cl.
CPC .............. *B65B 51/14* (2013.01); *B29C 65/18* (2013.01); *B29C 66/81* (2013.01);
(Continued)

(58) Field of Classification Search
CPC ....... B29C 65/18; B29C 66/81; B29C 66/814; B29C 66/8141; B29C 66/81411;
(Continued)

(56) References Cited

U.S. PATENT DOCUMENTS 5,993,593 A * 11/1999 Swartz .................. B29C 65/226
156/308.4
2004/0083682 A1 * 5/2004 Orsini ............... B29C 66/73715
53/374.8
(Continued)

FOREIGN PATENT DOCUMENTS

WO WO-2018041627 A1 * 3/2018 ............. B29C 65/04

OTHER PUBLICATIONS

European Patent Office, Extended European Search Report in Corresponding European Application No. 20168252.3, Aug. 24, 2020.

*Primary Examiner* — George R Koch
(74) *Attorney, Agent, or Firm* — Amarok IP Inc.; Neil W. Henderson (57) ABSTRACT

A packaging system for film including: a controller; and a seal jaw controlled by the controller, wherein the seal jaw includes: a first sealing bar; a second sealing bar; a servo motor controlling movement of at least one of the first and the second sealing bars between an open position and a closed position, where the sealing bars are in contact; and a pneumatic cylinder, connected with at least one of the first and second sealing bars, and controlling a pressure between the sealing bars when in the closed position. A method of creating a seal in packaging film, the method including: moving, via a servo motor, a first sealing bar and a second sealing bar from an open position to a closed position; and upon reaching the closed position, clamping, via a pneumatic cylinder, the sealing bars to create a seal in the packaging film.

19 Claims, 11 Drawing Sheets

(51) Int. Cl.
  *B29C 65/18* (2006.01)
  *B65B 61/06* (2006.01)
(52) U.S. Cl.
  CPC ...... *B29C 66/8246* (2013.01); *B29C 66/9221* (2013.01); *B29C 66/9261* (2013.01); *B65B 61/06* (2013.01)
(58) Field of Classification Search
  CPC .............. B29C 66/8145; B29C 66/816; B29C 66/8242; B29C 66/82421; B29C 66/8246; B29C 66/9221; B29C 66/9261; B65B 51/14; B65B 61/06
  See application file for complete search history.

(56) References Cited

U.S. PATENT DOCUMENTS

2004/0256373 A1* 12/2004 Irwin ................ B29C 66/81417
  219/243
2018/0057198 A1 3/2018 Anderson et al.

* cited by examiner

PACKAGING SYSTEM AND SEAL JAW FOR PACKAGING FILM

RELATED APPLICATIONS

This application claims priority to U.S. Provisional Patent Application No. 62/829,729, filed Apr. 5, 2019, which is hereby incorporated herein by reference.

FIELD

The disclosure is generally related to packaging systems and, more specifically, to a seal jaw for use with a semi-automated packaging system for packaging products or the like in a packaging film or bubble wrap.

BACKGROUND

Automated packaging systems have become more and more important with the need to more efficiently and effectively package products and the like for sending to customers. This is particularly true in on-line commerce, where there are potentially many customers requiring delivery of smaller items and an expectation of prompt delivery.

Conventional packaging machines typically have a seal jaw that includes at least one heated sealing bar that comes into contact with another sealing bar to seal a packaging film via heating on one or more sides of a product. In some cases, the seal jaw may need to be cycled a number of times for one package if a number of seals are to be made. Conventional seal jaws may be mechanically activated, for example using a cam system or the like to bring the sealing bars of the seal jaw together. For this and other reasons, conventional seal jaws may have issues with consistency of the heat seal, which can require re-work or manual handling of the sealed package.

For these and other reasons, there is a need for improved packaging systems for packaging film and for seal jaws therein.

SUMMARY

According to an aspect herein, there is provided a system and method for a seal jaw for use with a semi-automated packaging machine. The seal jaw includes a servo motor and a pneumatic cylinders for actuating the seal jaw among an open position, a closed position and a clamped position. The combination of the servo motor and the pneumatic cylinder provides for efficient closure of the seal jaw and control over the pressure of the seal jaw. Further, in some cases, the seal jaw may include impulse heated sealing bars such that the sealing bars are heated only when necessary to seal packages. In this manner, there is less likelihood of injury, because the highest heat can be limited to the time of sealing.

According to an aspect herein, there is provided a seal jaw for use in packaging a product, the seal jaw including: a first sealing bar; a second sealing bar; a servo motor for controlling movement of at least one of the first and the second sealing bars between an open position and a closed position where the first and second sealing bars are in contact; and a pneumatic cylinder connected with at least one of the first and second sealing bars and configured to control a pressure between the first and the second sealing bars when in the closed position.

In some cases, the first sealing bar may include a first set of sealing bars, including first horizontal and vertical sealing bars. Similarly, the second sealing bar may include a second set of sealing bars, including second horizontal and vertical sealing bars.

In some cases, the pneumatic cylinder may include a plurality of pneumatic cylinders configured to control the pressure, for example, by being appropriately spaced along a length of the related sealing bar or bars.

In some cases, at least one of the first and second sealing bars may be impulse heated.

In some cases, at least one of the first and second sealing bars may be configured to cut a packaging film during or after sealing.

In some cases, the pneumatic cylinder controls the pressure to provide a clamped position in which the first sealing bar and the second sealing bar are held together with a predetermined pressure. In this case, the pneumatic cylinder may also control the pressure to release at least one of the first sealing bar and the second sealing bar from the clamping position based on a sensor reading.

According to another aspect herein, there is provided a method of creating a seal in packaging film, the method including: moving, via a servo motor, a first sealing bar and a second sealing bar from an open position to a closed position; and upon reaching the closed position, clamping, via a pneumatic cylinder, the first sealing bar and second sealing bar at a predetermined pressure to create a seal in the packaging film.

In some cases, the method may further include, before or during the movement of the first sealing bar and the second sealing bar, impulse heating at least one of the first and second sealing bars to a predetermined temperature at or for a predetermined time.

In some cases, the clamping may further include cutting the packaging film at a predetermined location in relation to the seal.

In some cases, the method may further include: detecting, via a sensor, an alert condition; and based on the detection, controlling the pneumatic cylinder to release at least one of the first sealing bar and the second sealing bar from the clamping.

According to another aspect herein, there is provided a packaging system for use in packaging a product including: a controller; and a seal jaw controlled by the controller, wherein the seal jaw includes: a first sealing bar; a second sealing bar; a servo motor, controlled by the controller, for controlling movement of at least one of the first and the second sealing bars between an open position and a closed position where the first and second sealing bars are in contact; and a pneumatic cylinder, controlled by the controller, connected with at least one of the first and second sealing bars and configured to control a pressure between the first and the second sealing bars when in the closed position.

In some cases, based on a sensor signal, the controller may control the pneumatic cylinder to release at least one of the first sealing bar and the second sealing bar.

BRIEF DESCRIPTION OF THE DRAWINGS

Embodiments of the present disclosure will now be described, by way of example only, with reference to the attached Figures, in which.

DETAILED DESCRIPTION

The disclosure is generally directed at a seal jaw for sealing packaging film around a product or the like. One use of embodiments of the seal jaw is integration into an automated or semi-automated packaging machine or system. Generally speaking, the seal jaw includes both a servo motor and a pneumatic cylinder for enabling operation of the seal jaw. In some embodiments, the seal jaw includes or also includes impulse heated sealing bars. Generally speaking, embodiments herein are intended to overcome at least one of the problems with conventional packaging systems and seal jaws.

Figure 1:
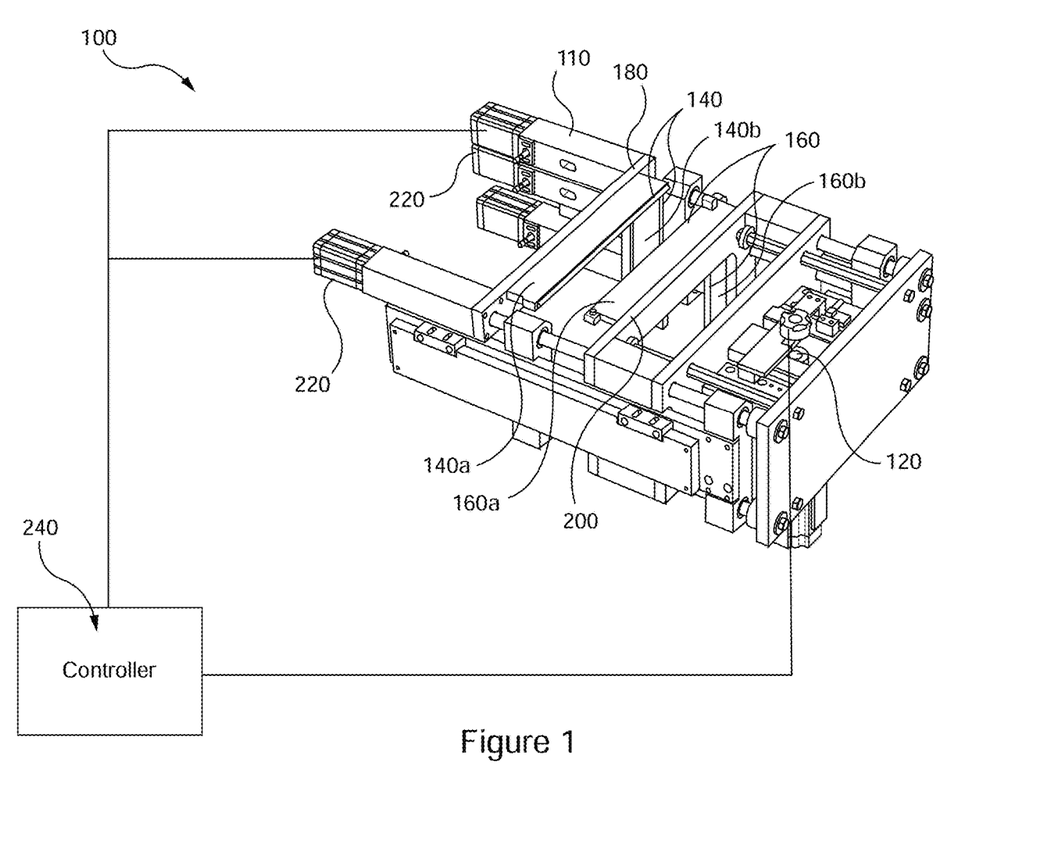
FIG. 1 is a perspective view of a servo-pneumatic seal jaw in accordance with an embodiment herein.

Turning to FIG. 1, a schematic diagram of an embodiment of a seal jaw 100 having servo-pneumatic functionality is provided. In this embodiment, the seal jaw is used with a semi-automated packaging machine to create packaging for holding goods or for the packaging of goods in a packaging film. In some embodiments, the packaging film may include a plurality, for example two, of sheets that are passed through the seal jaw. In other embodiments, the packaging film may be a single sheet that is folded over and fed through the seal jaw. In some embodiments, the packaging film may be bubble wrap. Operation of the seal jaw is discussed in more detail below.

As shown in FIG. 1, the embodiment of the seal jaw 100 includes a frame 110 that supports a servo motor 120, a first set of sealing bars 140 and a second set of sealing bars 160. The first set of sealing bars 140 is supported by and mounted to a first sealing bar support 180 and the second set of sealing bars 160 is supported by and mounted to a second sealing bar support 200. Both the first 180 and second 200 sealing bar supports may be part of or attached to the frame 110. The seal jaw 100 also includes a set of pneumatic cylinders 220. Although reference is made to pneumatic cylinders, other types of actuators, including hydraulic, cam-driven or the like may also be used. Generally speaking, the servo motor 120 provides actuation for the control of the first set of sealing bars 140 and the second set of sealing bars 160 while the set of pneumatic cylinders 220 provide further control in relation to the first 140 and second 160 set of sealing bars. In this embodiment, the servo motor 120 acts on the first set of sealing bars 140 and the set of pneumatic cylinders act on the second set of sealing bars but other arrangements are also possible.

Although referred to as sealing bars, one or both of the set of sealing bars may also provide a cutting functionality as discussed herein. As shown in FIG. 1, the first set of sealing bars 140 and the second set of sealing bars 160 substantially correspond with each other so that they meet when moved toward each other. Also, in this embodiment, each of the first and second set of sealing bars 140 and 160 includes two bars that are approximately perpendicular to each other. In particular, each set has a vertical sealing bar 140a, 160a and a horizontal sealing bar 140b, 160b. In some embodiments, the first set of sealing bars 140 may be silicone sealing bars and the second set of sealing bars 160 may be heated sealing bars. In this embodiment, the second set of sealing bars 160 are impulse heated rather than being maintained in a heated condition, as would typically be the case for conventional sealing bars. The impulse heating is intended to bring the sealing bars to a predetermined temperature at the time of sealing and allow the sealing bars to cool when not sealing.

As shown in FIG. 1, both the servo motor 120 and the pneumatic cylinders 220 may be controlled by a controller 240 that provides instructions, or signals, to actuate the servo motor 120 and/or the pneumatic cylinders 220. It will be understood that there may be more than one controller, for example, there may be a controller provided for each of the servo motor 120 and the pneumatic cylinders 220, and the controllers may be interconnected appropriately. Further, the controller(s) may interact with the overall packaging system and related equipment.

Figure 2:
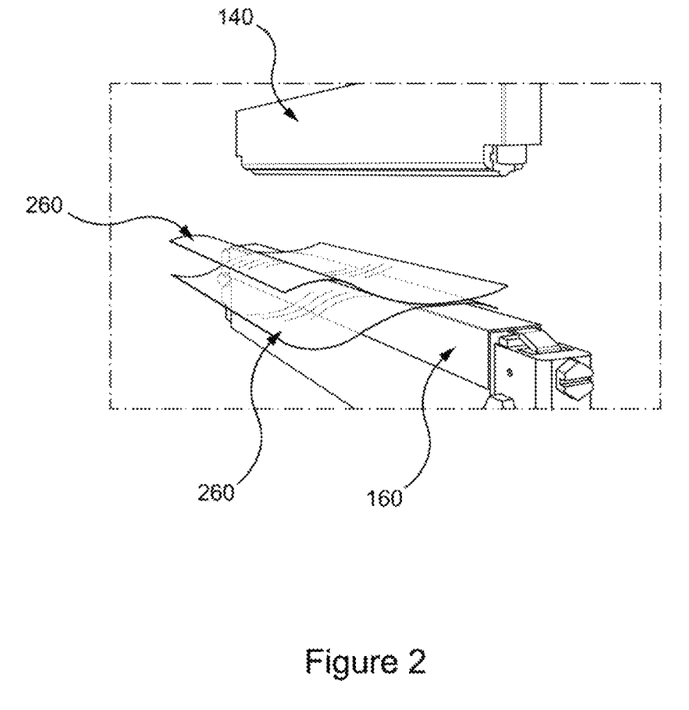
FIG. 2 is a schematic diagram of packaging sheets passing through a portion of the seal jaw of FIG. 1.

FIG. 2 shows one of each of the first and second set of sealing bars 140, 160 in further detail. In some embodiments, a surface of one set of sealing bars 160 that contacts the packaging film may be a flat bar having tape, such as Teflon™ tape, on its surface. Use of the tape is intended to facilitate cleaning of the sealing bars 160 after use. By applying the Teflon tape, the sealing bars generally accumulate less debris during operation. In some embodiments, the profile of the other of the set of sealing bars 140 is designed with no crevices or openings such that the build-up of debris on its surface (such as from the packaging sheets) is reduced or eliminated. With this arrangement, another advantage is that, if there is any buildup, the profile of the sealing bars 140 is preferably shaped to facilitate the clean up of any buildup.

As shown in FIG. 2, in operation, one or more packaging film sheets 260 pass between the first set of sealing bars 140 and the second set of sealing bars 160. FIG. 2 shows two packaging film sheets 260 but in other embodiments, a single folded sheet of packaging film may be inserted between the first and second sets of sealing bars 140, 160 (see FIG. 12 as an example). In this case, the folded edge can provide one side of the packaging while the other three sides can be sealed by the seal jaw 100. Based on signals from the controller 240, the second set of sealing bars 160 is impulse heated and then at least one set of sealing bars is actuated towards the other set to press against/clamp the packaging film sheets 260 in order to create a seal between the pair of packaging film sheets 260. In some cases, one of the set of sealing bars 140, 160 may be stationary while the other of the set of sealing bars 140, 160 is actuated while in other cases, both sets of sealing bars may move.

As the impulse heated sealing bars 160 create the seal in the vertical and horizontal direction, at leaset one set of sealing bars 140, 160 may also cut the pair of packaging film sheets in a predetermined position adjacent the seal. Generally, the cutting is a part of the sealing process, based on a shape/configuration of at least one of the sets of sealing bars. In some cases, there may be a separate cutting element (not shown) provided to the sealing bars.

Figure 3A:
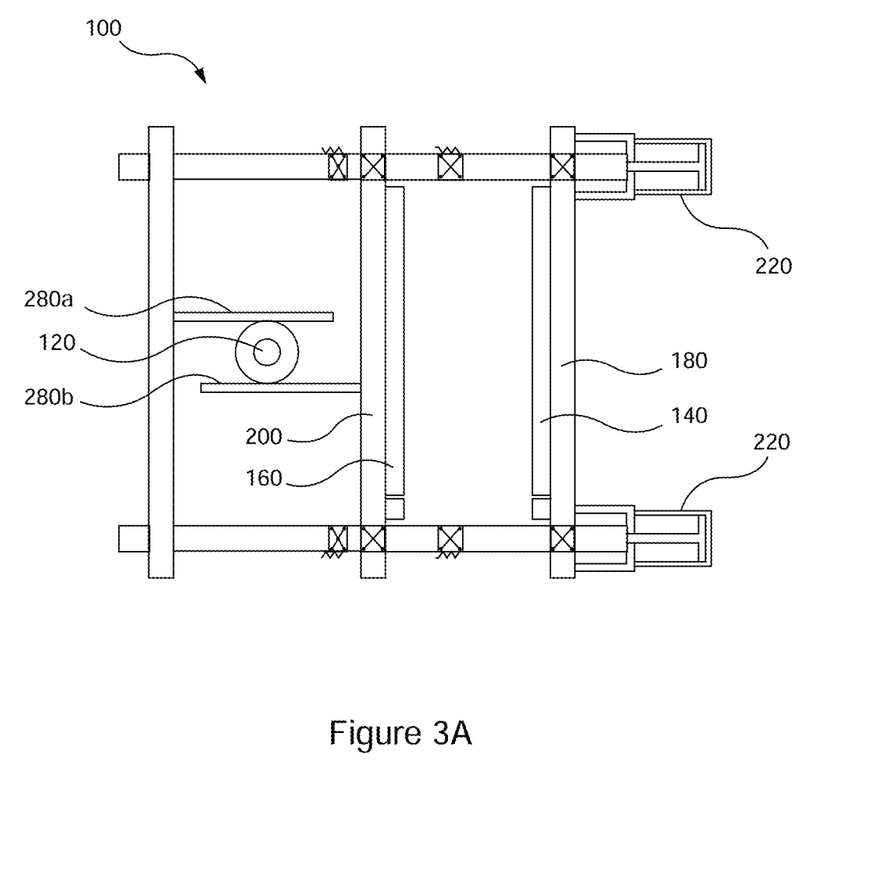
FIG. 3A is a schematic diagram of the seal jaw of FIG. 1 in an open position.
Figure 3B:
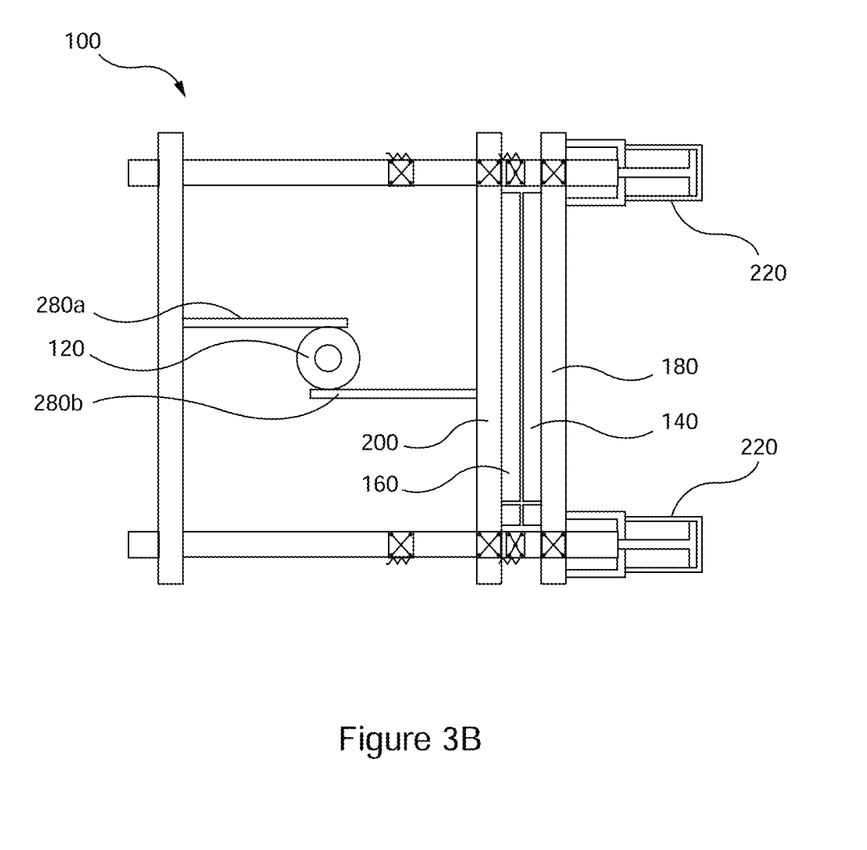
FIG. 3B is a schematic diagram of the seal jaw of FIG. 1 in a closed position; with a dark background.
Figure 3C:
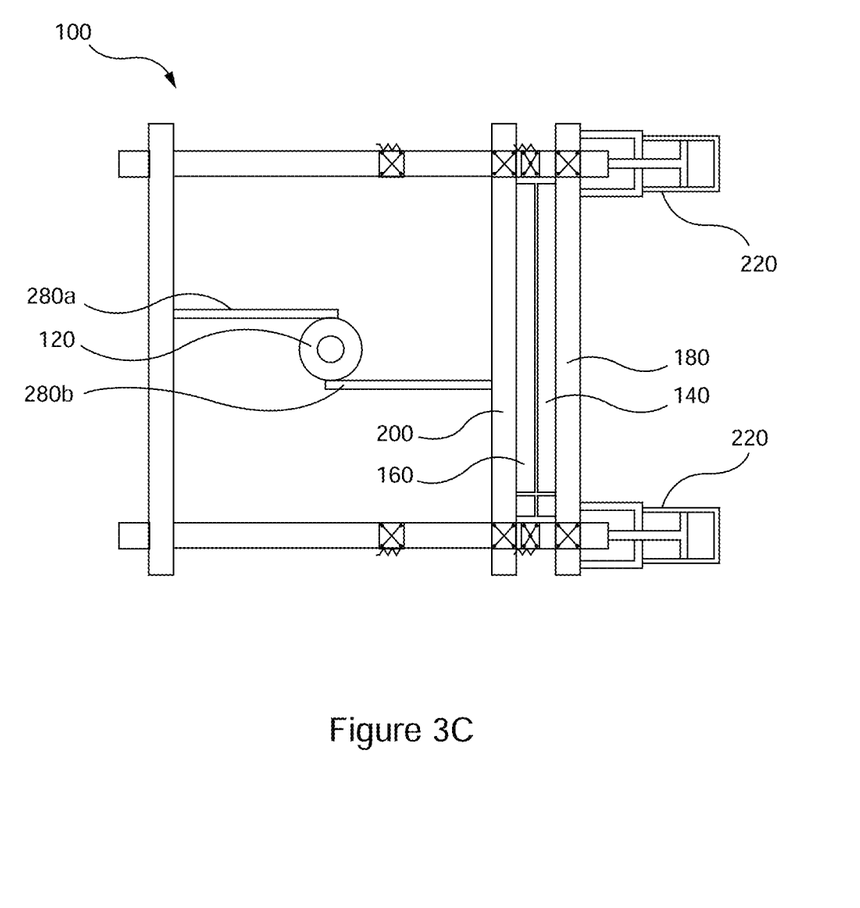
FIG. 3C is a schematic diagram of the seal jaw of FIG. 1 in a clamped position.

FIGS. 3A to 3C show schematic diagrams of the seal jaw actuation through various seal jaw positions. In particular, FIG. 3A shows the sealing bars in an open position, FIG. 3B in a closed position and FIG. 3C in a clamped position.

In the embodiment shown in FIGS. 3A to 3C, the servo motor 120 is connected to a pair of arms 280. One of the arms 280a is connected to the servo motor 120 and the frame 110 of the seal jaw 100 while the other arm 280b is connected to the servo motor 120 and the second sealing bar support 200. Actuation of the servo motor 120 causes the two sets of sealing bars to be actuated toward or away from each other between the open and closed positions depending on the signal provided by the controller. In some embodiments, actuation of the servo motor 120 controls movement of the two sets of sealing bars 140, 160 and actuation of the pneumatic cylinders provides control of the pressure between the sealing bars when in contact and, in some cases, improved safety and access to clear jams. In some embodiments, the seal jaw may be designed such that servo motor controls one set of sealing bars while the pneumatic cylinders control some movement of the other set of sealing bars or pressure between the two sets of sealing bars.

To move the sealing bars 140 and 160 between the open position and the closed position, the servo motor 120 actuates the arms 280a and 280b such that the second support bar 200 (and therefore, the second set of sealing bars 160) is actuated towards the first set of sealing bars 140. In this embodiment, the first support bar 180 (and therefore the first set of sealing bars 140) remains relatively stationary. Once the two sets of sealing bars are closed as illustrated in FIG. 3B, the set of pneumatic cylinders 220 can be operated to control the pressure between the two sets of sealing bars 140 and 160 to clamp, and in some cases, cut the packaging film sheets therebetween as shown in FIG. 3C. It is understood that FIGS. 3A to 3C are not to scale and that some aspects may be exaggerated for ease of understanding of the subject matter of the disclosure.

In this embodiment, the servo motor 120 provides fast and precise motion to move the sealing bars between the open and closed positions while the pneumatic cylinders 220 provide control over the pressure/force to assist the sealing and cutting processes. The combination of the servo motor 120 and the set of pneumatic cylinders 220 to control the sealing bars 140 and 160 can provide improved speed and control of the sealing/packaging process. Embodiments of the seal jaw are also intended to improve safety, package recovery and access to the packaging area below the seal jaw.

In some embodiments, the pneumatic cylinders 220 may include proportional control so that the force used for clamping can be dynamically adjusted in order to adapt for different films, different packaging, different products or the like. The proportional control may also be used to make adjustments in order to evenly distribute the clamp or compression force across a full length of the seal for varying contact lengths. The proportional control may also operate to stop a force from being applied by the sets of sealing bars if an obstruction is detected between the sealing bars. The ability to stop a force from being applied could reduce hazards to operators and/or to reduce damage to a product that is miss-positioned between the sealing bars.

Figure 4:
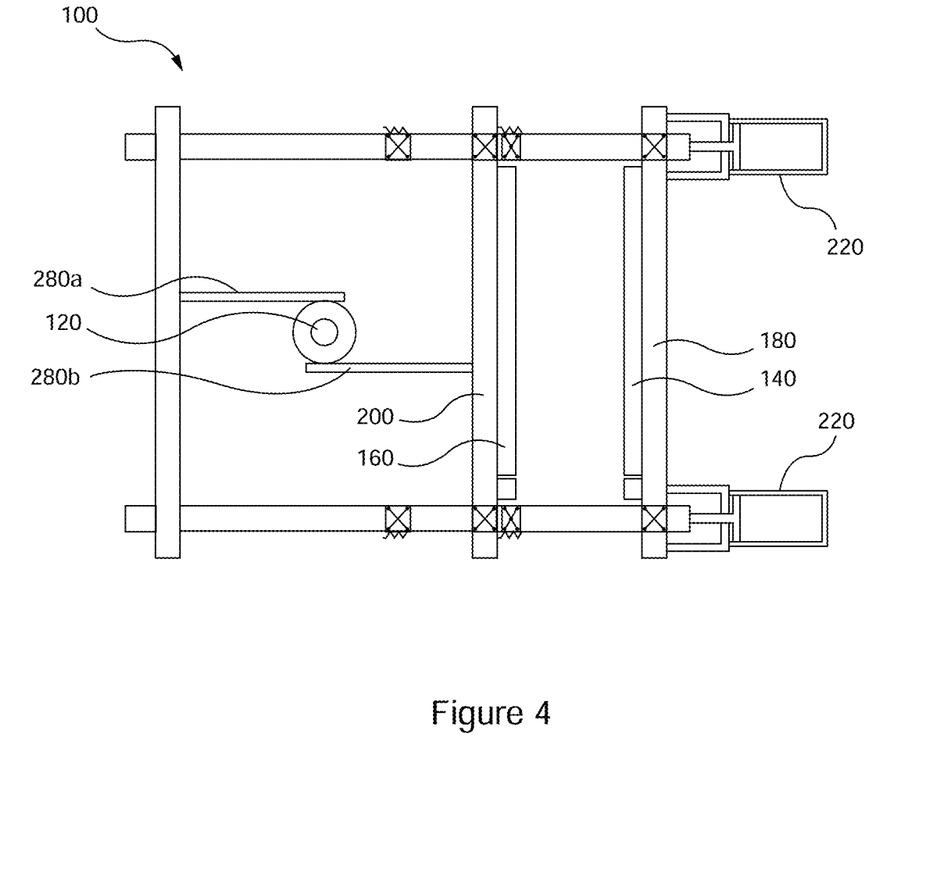
FIG. 4 is a schematic diagram of the seal jaw of FIG. 1 in an extended open position.

In some embodiments, the seal jaw 100 may include sensors, apparatus or the like to determine if there is an obstruction between the sealing bars during the sealing/closing process. If an obstruction is detected, or if there is a need to increase the distance between the sealing bars (past the open position), the set of pneumatic cylinders may be controlled to open the seal jaw 100 even if the servo motor is in the closed position (as schematically shown in FIG. 4). This functionality provides greater safety in that the seal jaw can be opened quickly and efficiently if there is a safety issue or the like.

Figure 5:
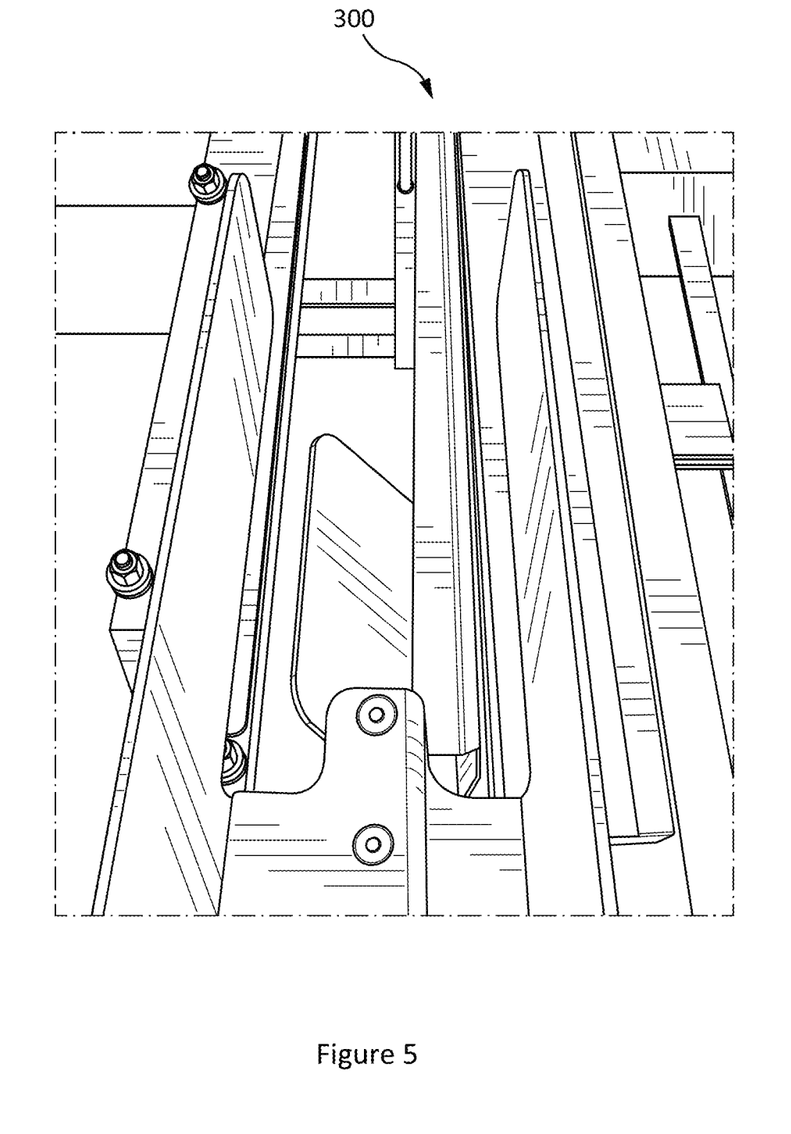
FIG. 5 is an illustration of a pneumatic kicker for a seal jaw.

In some embodiments, the system may also include a pneumatic kicker to assist with the separation of the sealing bars 140 and 160 after the sealing and cutting is complete. An example of a pneumatic kicker 300 is shown in FIG. 5.

Figure 6:
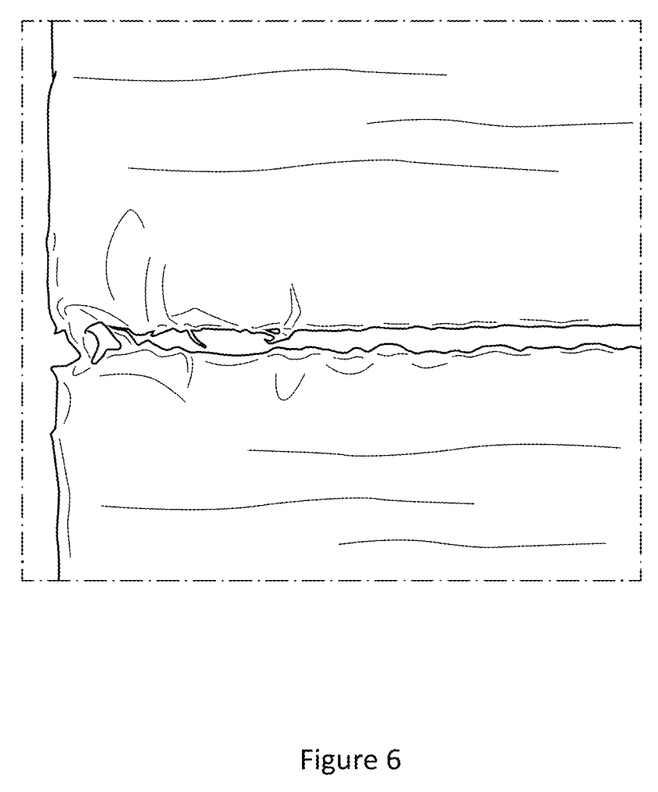
FIG. 6 is an illustration of a faulty (uncut) packaging seal.

In an experiment, an embodiment of a seal jaw based on the above description provided a yield of approximately 100% with only a small number of packages requiring manual rework. In this experiment, for 2000 sealed packages, only four (4) packages required rework. In all cases, uncut sections (as illustrated in FIG. 6) were repairable with minor manual reworking. Manual reworking did not result in defects or unusable product. The experiments also revealed that embodiments of the seal jaws herein provided a higher run rate than conventional seal jaws, thus providing more efficient packaging.

Preliminary destructive stress testing was performed to determine seal integrity compared to samples from standard perforations or conventional sealing equipment. The results of this testing indicated that embodiments of the seal jaw described herein provided seals having similar or improved strength compared with standard perforations or conventional sealing equipment.

Figure 7:
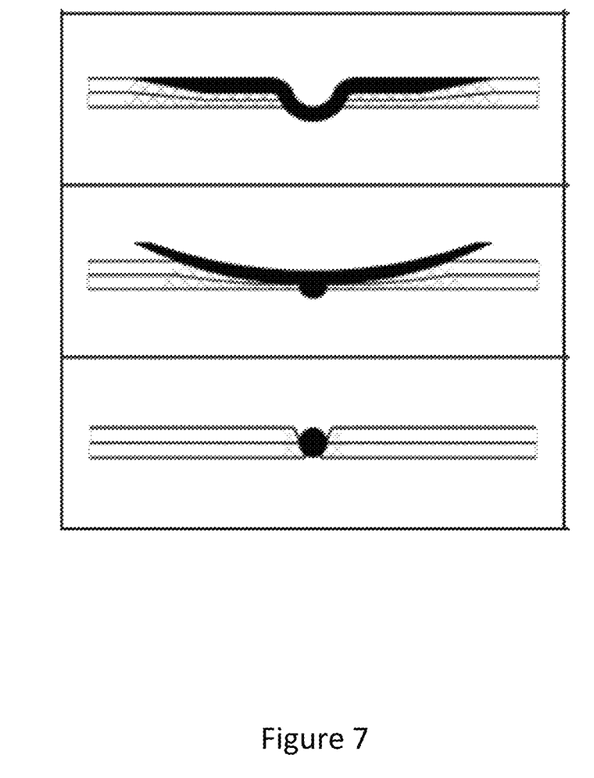
FIG. 7 is a schematic diagram of sealing bar profiles.

A further intended advantage of embodiments herein is with regard to flexibility. For example, any number of different types of sealing bars (examples of which are illustrated in FIG. 7) can be used such that different seals and cuts can be provided in order to work with different packaging designs or packaging film materials. Embodiments of the seal jaw may manage a full range of product weights and sizes. Furthermore, embodiments of the seal jaw may produce packages of varying widths and heights, generally without changeover. In some cases, a change of the sealing bars may be required for more significant changes in product width but this can be done relatively efficiently.

Another intended advantage of embodiments of the seal jaw is that the seal jaw may be able to detect a misplaced product (or obstruction) when the seal jaw is moving toward the closed position whereby the seal jaw (or sealing bars) may be retracted to avoid damage to the product and/or the seal jaw before the seal jaw is actuated into the clamping position.

Other safety advantages that may be recognized in embodiments of the seal jaw include a reduction in heat hazards. Since the sealing bars use impulse heating, the sealing bars are only heated for a limited duration, and in some cases, this may be only while the sealing bars are moving toward a closed position or only while in direct contact with the packaging film. In some embodiments, the system includes a thermocouple that outputs a temperature of the sealing bars to the user. Residual heat that may remain after a seal/cut is created or performed is typically not at as hazardous or dangerous levels. Another safety advantage is that there is an improved hazard response. Since the set of pneumatic cylinders or actuators controls the compression force of the sealing bars, the seal jaw, or the pressure thereon can be released/opened when a light curtain, other safety sensor, or the like is activated. This may reduce the risk of operator injury compared to a mechanical or cam-based actuation seal jaw system. Furthermore, in a similar way, cutting hazards may be reduced. In some cases, the use of silicone for the sealing bars may be sufficient to cut the plastic packaging but may not be sufficient to cut an individual. In some embodiments, the system may include sensors to determine if there are any safety concerns during the sealing process and send a signal or the like to the controller whereby the process may be stopped or postponed until the matter is taken care of. For instance, a sensor may sense an obstruction or alien object between the sealing bars during the sealing process (such as when the seal jaw is moved toward the closed position) whereby the sealing bars need to be separated or kept separated so that the obstruction may be investigated and/or removed.

Figure 8:
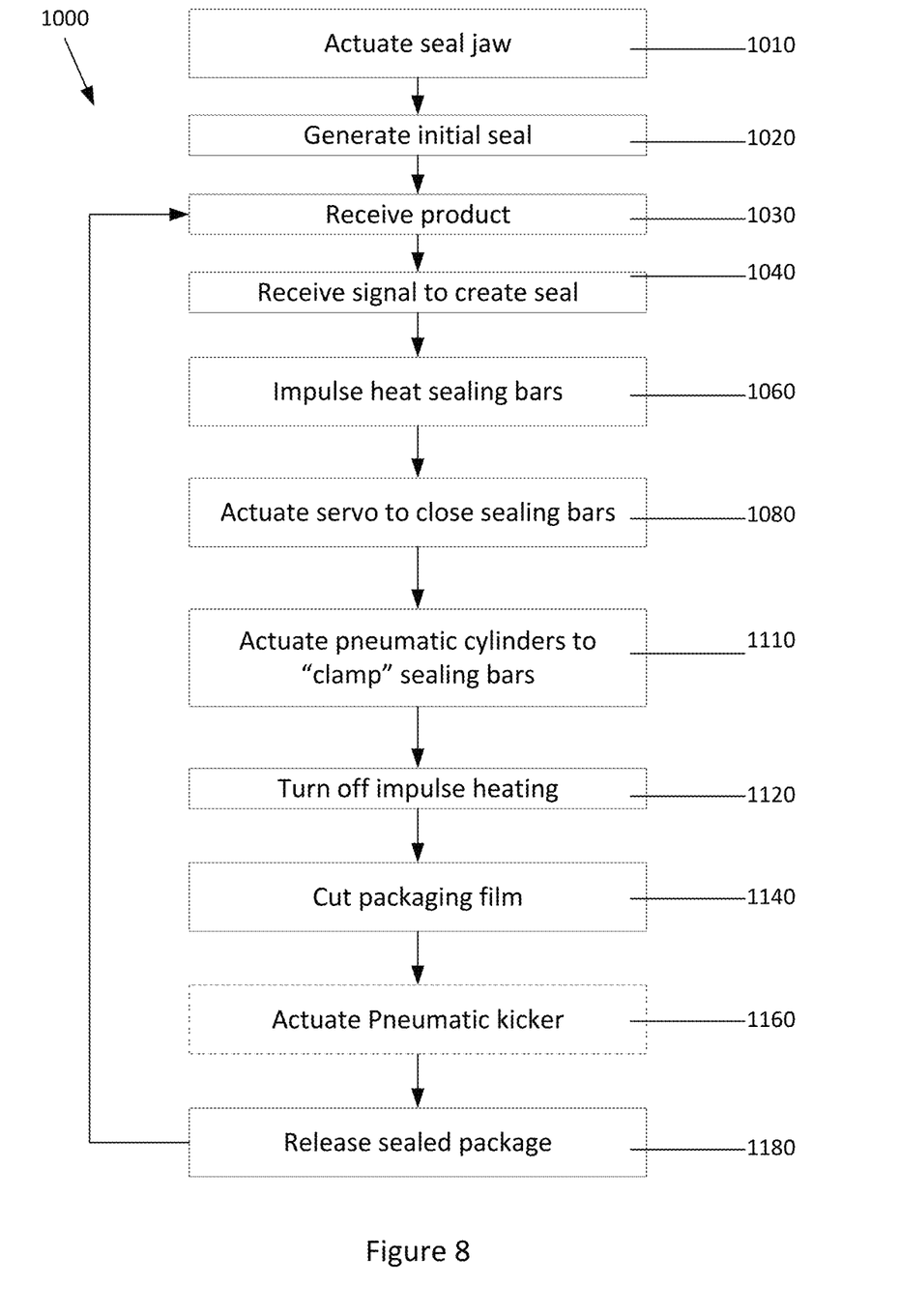
FIG. 8 is a flowchart of an embodiment of a method of sealing packages.

FIG. 8 shows a flowchart of an embodiment of a method of sealing a package 1000 using an automatic or semi-automatic packaging machine. It will be understood that the packaging machine includes an embodiment of the seal jaw that is mounted to the packaging machine.

Figure 9:
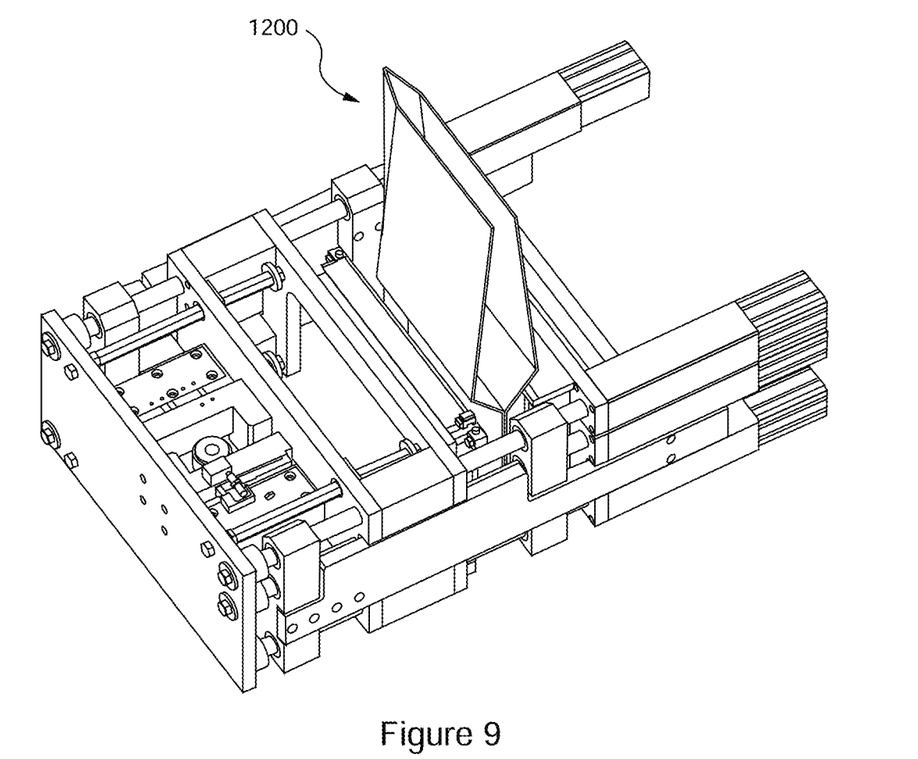
FIG. 9 is a schematic diagram of a packaging film being passed through a seal jaw.

In order to package the product, a folded packaging film sheet is passed between the first set of sealing bars and the second set of sealing bars. Based on predetermined instructions, the seal jaw operates to create sealed packaging around the product. As will be understood, the folded edge of the packaging film sheet can be located with an orientation opposite the vertical sealing bar and generally perpendicular to the horizontal sealing bar to provide one of the sealed edges 1200 of the packaging. This is schematically shown in FIG. 9.

Initially, the film is loaded into the seal jaw and the seal jaw is actuated (as described in this method) to place the seal jaw in the clamped position (1010) and create an initial seal (1020) along at least a horizontal location on the packaging film. The initial seal provides a sealed edge adjacent to and generally perpendicular to the folded edge such that two sides of the packaging are sealed prior to a product being inserted into the packaging. An item is then loaded into the packaging either by an automatic process or by an operator (1030).

A control system then provides a signal to the sealing jaw to create a seal (1040). When the signal is received, the second set of sealing bars are impulse heated (1060). It will be understood that the heating of the second set of sealing bars may be done for a predetermined time, which may be only during the sealing, or which may be only while the sealing bars are coming close to a closed position or the like, depending on the particular materials involved. Concurrently, or consecutively, the control system actuates the servo motor (1080) such that the sealing bars are moved towards each other from the open position to the closed position.

When the bars reach the closed position, the pneumatic cylinders are actuated (1100) to provide a further compressing force between the two sets of sealing bars and the packaging film sheet therebetween. In the clamped position, the sealing bars are in contact with each other with the packaging film sheet therebetween, the packaging film is heated, and a seal is generated.

Once the seal is generated, the impulse heating provided to the sealing bars can then be stopped (1120). The control signal to stop the impulse heating can be sent by the control system at any of various points once the seal has been formed or thereafter.

While in the clamped position, the sealing bars cut the packaging film (1140) at a predetermined location. Generally, the horizontal sealing bars are provided with the ability to cut the packaging material. However, depending on the size of the packaging film, the vertical sealing bars may also include a cutting function to cut off excess packaging film at a side of the product. For at least the horizontal sealing bars, the predetermined location for the cut is typically within the seal created by the sealing bars such that a lower seal and upper seal are generated. The lower seal is for the package that was just created and the upper seal is for an initial seal or base seal of the next package to be created (as noted above).

In some embodiments or for some situations, the control system may optionally actuate a pneumatic kicker to cause the release of the package film from the sealing bars (1160). Upon release from the sealing bars, the sealed package is released from the seal jaw (1180). In some cases, the sealed package may be released such that the sealed package is dropped or released onto a conveyor. As will be understood, the seal is configured to be large enough such that when the cut within the seal is performed, the edge of the package being dropped is sealed and a seal (the same as the initial seal) is provided for the next package such that a product can then be dropped in and the process repeated from receiving the product 1030.

In some embodiments, it will be understood that each set of sealing bars may include a pair of vertical sealing bars and a single horizontal sealing bar whereby two separate sheets of packaging material (instead of a folded sheet of packaging film) may be passed through the seal jaw and three sealed edges can be created during each cycle. Further, there may be some embodiments where each set of sealing bars may only include one sealing bar, typically a horizontal sealing bar, for example, in the case where the packaging film already has seals on both sides.

Further, in some embodiments, the seal jaw may include a single pneumatic cylinder or a plurality of pneumatic cylinders configured to provide similar functionality to the pair of pneumatic cylinders in the embodiment above by appropriate positioning along the sealing bar support holding the sealing bar or bars.

In the preceding description, for purposes of explanation, numerous details are set forth in order to provide a thorough understanding of the embodiments. However, it will be apparent to one skilled in the art that other arrangements of the elements in each embodiment would be feasible. Further, it will be apparent to one of skill in the art that the control The above-described embodiments are intended to be examples only. Alterations, modifications and variations can be effected to the particular embodiments by those of skill in the art without departing from the scope of the application, which is defined solely by the claims appended hereto.

What is claimed is:

1. A seal jaw for use in packaging a product comprising:
   a first sealing bar;
   a second sealing bar;
   a servo motor for controlling movement of the second sealing bar between an open position and a closed position where the first and second sealing bars are in contact; and
   a pneumatic cylinder connected with the first sealing bar and configured to move the first sealing bar in order to control a pressure between the first and the second sealing bars when in the closed position and configured to, if an obstruction is detected between the first and second sealing bars, move the first sealing bar away from the second sealing bar and beyond the first sealing bar's open position without moving the servo motor.

2. A seal jaw according to claim 1 wherein the first sealing bar comprises a first set of sealing bars, comprising first horizontal and vertical sealing bars.

3. A seal jaw according to claim 2 wherein the second sealing bar comprises a second set of sealing bars, comprising second horizontal and vertical sealing bars.

4. A seal jaw according to claim 1 wherein the pneumatic cylinder comprises a plurality of pneumatic cylinders configured to control the pressure.

5. A seal jaw according to claim 1 wherein at least one of the first and second sealing bars cuts a packaging film during or after sealing.

6. A seal jaw according to claim 1 wherein the pneumatic cylinder controls the pressure to provide a clamped position in which the first sealing bar and the second sealing bar are held together with a predetermined pressure.

7. A method of creating a seal in packaging film, the method comprising:
   moving, via a servo motor, a first sealing bar toward a second sealing bar from an open position to a closed position;
   detecting if there is an obstruction between the first sealing bar and the second sealing bar and, if so, moving, via a pneumatic cylinder, the second sealing bar away from the first sealing bar and further away from the first sealing bar than the second sealing bar's open position without moving the servo motor, and otherwise,
   upon reaching the closed position, clamping, via the pneumatic cylinder, the first sealing bar and second sealing bar at a predetermined pressure to create a seal in the packaging film.

8. A method according to claim 7 further comprising, during the movement of the first sealing bar, impulse heating at least one of the first and second sealing bars.

9. A method according to claim 7 wherein the clamping further comprises cutting the packaging film at a predetermined location in relation to the seal.

10. A method according to claim 7 wherein the
    detecting comprises detecting, via a sensor, the obstruction.

11. A packaging system for use in packaging a product, the system comprising:
    a controller; and
    a seal jaw controlled by the controller, the seal jaw comprising:
    a first sealing bar;
    a second sealing bar;
    a servo motor, controlled by the controller, for controlling movement of the second sealing bar between an open position and a closed position, where the first and second sealing bars are in contact; and
    a pneumatic cylinder, controlled by the controller, connected with the first sealing bar and configured to move the first sealing bar in order to control a pressure between the first and the second sealing bars when in the closed position and configured to, if an obstruction is detected between the first and second sealing bars, move the first sealing bar away from the second sealing bar and beyond the first sealing bar's open position without moving the servo motor.

12. A packaging system according to claim 11 further comprising a sensor to detect the obstruction.

13. A packaging system according to claim 11 wherein at least one of the first and second sealing bars is impulse heated.

14. A packaging system according to claim 11 wherein the first sealing bar comprises a first set of sealing bars, comprising first horizontal and vertical sealing bars.

15. A packaging system according to claim 14 wherein the second sealing bar comprises a second set of sealing bars, comprising second horizontal and vertical sealing bars.

16. A packaging system according to claim 11 wherein the pneumatic cylinder comprises a plurality of pneumatic cylinders.

17. A packaging system according to claim 11 wherein at least one of the first and second sealing bars cuts a packaging film during or after sealing.

18. A packaging system according to claim 11 wherein the pneumatic cylinder controls the pressure to provide a clamped position in which the first sealing bar and the second sealing bar are held together with a predetermined pressure.

19. A seal jaw for use in packaging a product comprising:
    a controller;
    a first sealing bar;
    a second sealing bar;
    a servo motor, controlled by the controller, to move the second sealing bar between an open position and a closed position where the first and second sealing bars are in contact; and
    a pneumatic cylinder connected with the first sealing bar, controlled by the controller, to move the first sealing bar in order to control a pressure between the first and the second sealing bars when in the closed position and to, if an obstruction is detected between the first and second sealing bars, move the first sealing bar away from the second sealing bar and beyond the first sealing bar's open position without moving the servo motor.

* * * * *